US010089576B2

(12) United States Patent
Gao et al.

(10) Patent No.: US 10,089,576 B2
(45) Date of Patent: Oct. 2, 2018

(54) REPRESENTATION LEARNING USING MULTI-TASK DEEP NEURAL NETWORKS

(71) Applicant: Microsoft Technology Licensing, LLC, Redmond, WA (US)

(72) Inventors: Jianfeng Gao, Woodinville, WA (US); Li Deng, Redmond, WA (US); Xiaodong He, Sammamish, WA (US); Ye-Yi Wang, Redmond, WA (US); Kevin Duh, Kizugawa (JP); Xiaodong Liu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 479 days.

(21) Appl. No.: 14/811,808

(22) Filed: Jul. 28, 2015

(65) Prior Publication Data

US 2017/0032035 A1 Feb. 2, 2017

(51) Int. Cl.
*G06F 17/30* (2006.01)
*G06N 3/08* (2006.01)

(52) U.S. Cl.
CPC ........... *G06N 3/08* (2013.01); *G06F 17/3069* (2013.01); *G06F 17/30867* (2013.01)

(58) Field of Classification Search
CPC ................... G06F 17/3069; G06F 17/2785
See application file for complete search history.

(56) References Cited

U.S. PATENT DOCUMENTS

| 8,234,228 | B2 | 7/2012 | Weston et al. | |
|---|---|---|---|---|
| 8,504,361 | B2 | 8/2013 | Collobert et al. | |
| 8,990,128 | B2 | 3/2015 | He et al. | |
| 9,262,406 | B1 * | 2/2016 | Das | G06F 17/289 |
| 2005/0171948 | A1 * | 8/2005 | Knight | G06F 17/30616 |
| 2010/0161596 | A1 * | 6/2010 | Yan | G06F 17/30675 |
| | | | | 707/723 |
| 2014/0052755 | A1 * | 2/2014 | Pitman | G06F 17/30424 |
| | | | | 707/771 |
| 2015/0074027 | A1 * | 3/2015 | Huang | G06N 3/0454 |
| | | | | 706/25 |
| 2016/0307566 | A1 * | 10/2016 | Bellegarda | G06F 17/2705 |

FOREIGN PATENT DOCUMENTS

CN 103345656 A 10/2013

OTHER PUBLICATIONS

Karhunen, "Principal Component Neural Networks—Theory and Applications", in the Journal of Pattern Analysis & Applications, vol. 1, No. 1, Mar. 1998, pp. 74-75.
(Continued)

*Primary Examiner* — Robert W Beausoliel, Jr.
*Assistant Examiner* — Nirav K Khakhar
(74) *Attorney, Agent, or Firm* — Schwegman Lundberg & Woessner, P.A.

(57) ABSTRACT

A system may comprise one or more processors and memory storing instructions that, when executed by one or more processors, configure one or more processors to perform a number of operations or tasks, such as receiving a query or a document, and mapping the query or the document into a lower dimensional representation by performing at least one operational layer that shares at least two disparate tasks.

17 Claims, 6 Drawing Sheets

(56) References Cited

OTHER PUBLICATIONS

Orr et al., "Neural Networks: Tricks of the Trade", Springer, Jul. 2003, 425 pages.
Bai et al., "Learning High-level Image Representation for Image Retrieval via Multi-Task DNN using Clickthrough Data", in the Proceedings of the Computing Research Repository, Dec. 21, 2013, 8 pages.
Baroni et al., "Don't count, predict! A systematic comparison of context-counting vs. context-predicting semantic vectors", in the Proceedings of the 52nd Annual Meeting of the Association for Computational Linguistics, vol. 1, Jun. 2014, 10 pages.
Baroni et al., "Frege in Space: A Program for Compositional Distributional Semantics", in the Journal of Linguistic Issued in Language Technology, vol. 9, Iss. 6, Feb. 2014, 107 pages.
Blei et al., "Latent Dirichlet Allocation", in the Journal of Machine Learning Research, vol. 3, Jan. 2003, pp. 993-1022.
Bordes et al., "Joint Learning of Words and Meaning Representations for Open-Text Semantic Parcing", in the Proceedings of the International Conference on Artificial Intelligence and Statistics, Apr. 2012, 9 pages.
Bradley, "The Use of the Area Under the ROC Curve in the Evaluation of Machine Learning Algorithms", in the Journal of Pattern Recognition, vol. 30, No. 7, 33 pages.
Burges et al., "Learning to Rank using Gradient Descent", in the Proceedings of the 22nd International Conference on Machine Learning, Aug. 2005, pp. 89-96.
Caruana, "Multitask Learning", in the Journal of Machine Learning, vol. 28, Iss. 1, Jul. 1997, 35 pages.
Chapelle et al., "Multi-Task Learning for Boosting with Applicationto Web Search Ranking", in the Proceedings of the 16th ACM SIGKDD International Conference on Knowledge Discovery and Data Mining, Jul. 25, 2010, 9 pages.
Chen et al., "A Fast and Accurate Dependency Parser using Neural Networks", in the Proceedings of the 2014 Conference on Empirical methods in Natural Language Processing, Oct. 2014, 11 pages.
Collobert et al., "A Unified Architecture for Natural Language Processing: Deep Neural Networks with Mutlitask Learning", in the Proceedings of the 25th International Conference on Machine Learning, Jul. 2008, 8 pages.
Collobert et al., "Natural Language Processing (almost) from Scratch", in the Journal of Machine Larning Research, No. 1, Oct. 2000, 34 pages.
Deerwester et al., "Indexing by Latent Semantic Analysis", in the Journal of American Society for Information Science, vol. 41, No. 6, Sep. 1990, pp. 391-407.
Duchi et al., "Adaptive Subgradient Methods for Online Learning Stochastic Optimization", in teh Journal of Machine Learning Research, vol. 12, Jul. 2011, pp. 2121-2159.
Duh et al., "N-best Reranking by Multitask Learning", in the Proceedings of the Joint Fifth Workshop on Statistical Translation and Metrics MATR Association for Computational Linguistics, Jul. 2010, 9 pages.
Gabrilovich et al. "Computing Semanitc Relatedness using Wikipedia-based Explicit Semantic Analysis", in the Proceedings of the 20th International Joint Conference on Artifical Intelligence, Jan. 2007, pp. 1606-1611.
Gao et al., "Clickthrough-Based Latent Semantic Models for Web Search", in the Proceedings of the 34th Intenrational ACM SIGIR Conference on Research and Development in Information Retrieval, Jul. 2011, 10 pages.
Gao et al., "Clickthrough-Based Translation Models for Web Search: from Word Models to Phrase Models", in the Proceedings of the 19th ACM International Conference on Information and Knowledge Management, Oct. 2010, 10 pages.
Gao et al., "Learning Continuous Phrase Representations for Translation Modeling", in the Proceedings of the 52nd Annual Meeting of the Association for Computational Linguistics, Jun. 2014, 11 pages.
Gao et al., "Modeling Interestingness with Deep Neural Networks", in the Proceedings of the 2013 Conference on Empirical Methods in Natural Language Processing, Oct. 2014, 12 pages.
He et al., "A Graph-based Framework for Multi-Task Multi-View Learning", in the Proceedings of teh 28th International Conference on Machine Learning, Jul. 2011, 8 pages.
Hofmann, "Probabilistic Latent Semantic Indexing", in the Proceedings of the 22nd Annual International ACM SIGIR Conference on Research and Development in Information Retrieval, Aug. 1999, 8 pages.
Huang et al., "Learning Deep Structured Semantic Models for Web Search using Clickthrough Data", in the Proceedings of the 22nd ACM International Conference on Information & Knowledge Management, Oct. 2013, 6 pages.
Huang et al., "Multi-Task Deep Neural Network for Multi-Label Learning", in the Proceedings of the 20th IEEE International Conference on Image Processing, Sep. 2013, 4 pages.
Irsoy et al., "Deep Recursive Neural Networks Compositionality in Language", in the Proceedings of the Annual Conference on Neural Information Processing Systems, Dec. 2014, 9 pages.
Iyyer et al., "A Neural Network for Factoid Question Answering Over Paragraphs", in the Proceedings of teh 2014 Conference on Empirical Methods in Natural Language Processing, Oct. 2014, 12 pages.
Jarvelin et al., "IR Evaluation Methods for Retrieving Highly Relevant Documents", in the Proceedings of the 23rd Annual International ACM SIGIR Conference on Research and development in Information Retrieval, Jul. 2000, 8 pages.
Kalchbrenner et al., "A Convolutional Neural Network for Modelling Sentences", in the Proceedings of teh 52nd Annual Meeting of the Association for Computational Linguistics, Jun. 2014, 11 pages.
Le et al., "Distributed Representations of Sentences and Documents", in the Proceedings of the 31st International Conference on Machine Learning, Jun. 2014, 9 pages.
Liu et al., "Representation Learning Using Multi-Task Deep Neural Networks for Semantic Classification and Information Retrieval", in the Proceedings of the North American Chapter of the Association for Computational Linguistics, May 2015, 10 pages.
Mikolov et al., "Distributed Representations of Words and Phrases and their Compositionality", in the Proceedings of the 27th Annual Conference on Neural Information Processing Systems, Dec. 2013, 9 pages.
Mikolov et al., "Linguistic Regularities in Continuous Space Word Representations", in the Proceedings of the Conference of the North American Chapter of the Association for Computation Linguistics: Human Language Technologies, May 2013, 6 pages.
Milajevs et al., "Evaluating Neural Word Representations in Tensor-Based Compositional Settings", in the Proceedings of the Conference on Empirical Methods in Natural Language Processing, Oct. 25, 2014, pp. 708-719.
Mnih et al., "Learning Word Embeddings Efficiently with Noise-Contrastive Estimation", in the Journal of Advances in Neural Information Processing Systems, Dec. 2013, 9 pages.
Pennington et al., "GloVe: Global Vectors for Word Representation", in the Proceedings of the Empirical Methods in Natural Language Processing, Oct. 25, 2014, 12 pages.
Scholkopf et al., "Nonlinear Component Analysis as a Kernel Eigenvalue Problem", in the Journal of Neural Computation, vol. 10, Iss. 5, Dec. 1996, 21 pages.
Shen et al., "A Latent Semantic Model with Convolutional-Pooling Structure for Informational Retrieval", in the Proceedings of the 23rd ACM International Conference on Information and Knowledge Management, Nov. 2014, 10 pages.
Shen et al., "Query Enrichment for Web-query Classification", in the Journal of ACM Transactions on Information Systems, vol. 24, Iss. 3, Jul. 2006, 33 pages.
Socher et al., "Recursive Deep Models for Semantic Compsitionality Over a Sentiment Treebank", in the Proceedings of the Conference on Empirical Methods in Natural Language Processing, Oct. 2013, 12 pages.
Stadermann et al., "Multi-task Learning Strategies for a Recurrent Neural Net in a Hybrid Tied-Posteriors Acoustic Model", In the Proceedings of Interspeech, Sep. 2005, 4 pages.

(56) References Cited

OTHER PUBLICATIONS

Turian et al., "Word Represenatations: A Simple and General Method for Semi-Supervised Learning", in the Proceedings of the 48th Annual Meeting of the Association for Computation Linguistics, Jul. 11, 2010, pp. 384-394.

Weinberger et al., "Feature Hashing for Large Scale Multitask Learning", in the Proceedings of the 26th Annual International Conference on Machine Learning, Jul. 14, 2009, 10 pages.

Zhai et al., "A Study of Smoothing Methods for Language Models Applied to Ad Hoc Information Retrieval", in the Proceedings of teh 24th Annual International ACM SIGIR Conference on Research and Development in Information Retrieval, Sep. 1, 2001, 9 pages.

Zhao et al., "Deep Semantic Ranking Based Hashing for Multi-Label Image Retrieval", in the Proceedings of the Computing Research Repository, Jan. 2015, 9 pages.

Zhuang et al., "Cross-Media Hashing with Neural Networks", in the Proceedings of the ACM International Conference on Mutlimedia, Nov. 2014, pp. 901-904.

\* cited by examiner

REPRESENTATION LEARNING USING MULTI-TASK DEEP NEURAL NETWORKS

BACKGROUND

Data-driven or supervised machine-learning algorithms are emerging as important tools for information analysis in portable devices, the cloud, and other computing devices. Machine learning involves various algorithms that can automatically learn over time. The foundation of these algorithms is built on mathematics and statistics that can be employed to predict events, classify entities, diagnose problems, and model function approximations. Applications of these algorithms include semantic text analysis, web search, and speech and object recognition, just to name a few examples. Supervised machine-learning algorithms typically operate in two phases: training and testing. In the training phase, typical input examples are used to build decision models that characterize the data. In the testing phase, the learned model is applied to new data instances in order to infer different properties such as relevance and similarity.

Generally, a search engine processes a query by directly comparing terms in the query with terms in documents. In some cases, however, a query and a document use different words to express the same concept. The search engine may produce unsatisfactory search results in such circumstances. A search engine may augment a query by finding synonyms of the query terms and adding those synonyms to the query. But this technique may fail to uncover semantic similarities between a query and a document.

SUMMARY

This disclosure describes, in part, techniques and architectures for a system, such as a machine learning system, that uses a multi-task deep neural network for representation learning for semantic classification (e.g., query classification) and semantic information retrieval tasks (e.g., ranking for web searches). Arbitrary text queries and documents may be mapped into semantic vector representations in a low dimensional latent space. Disparate tasks, such as operations necessary for classification and operations for ranking, may be combined. The system may apply such representation learning to query classification and web search, for example.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic (e.g., Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs)), and/or other technique(s) as permitted by the context above and throughout the document.

BRIEF DESCRIPTION OF THE DRAWINGS

The detailed description is described with reference to the accompanying FIGURES. In the FIGURES, the left-most digit(s) of a reference number identifies the FIGURE in which the reference number first appears. The same reference numbers in different FIGURES indicate similar or identical items.

DETAILED DESCRIPTION

Figure 1:
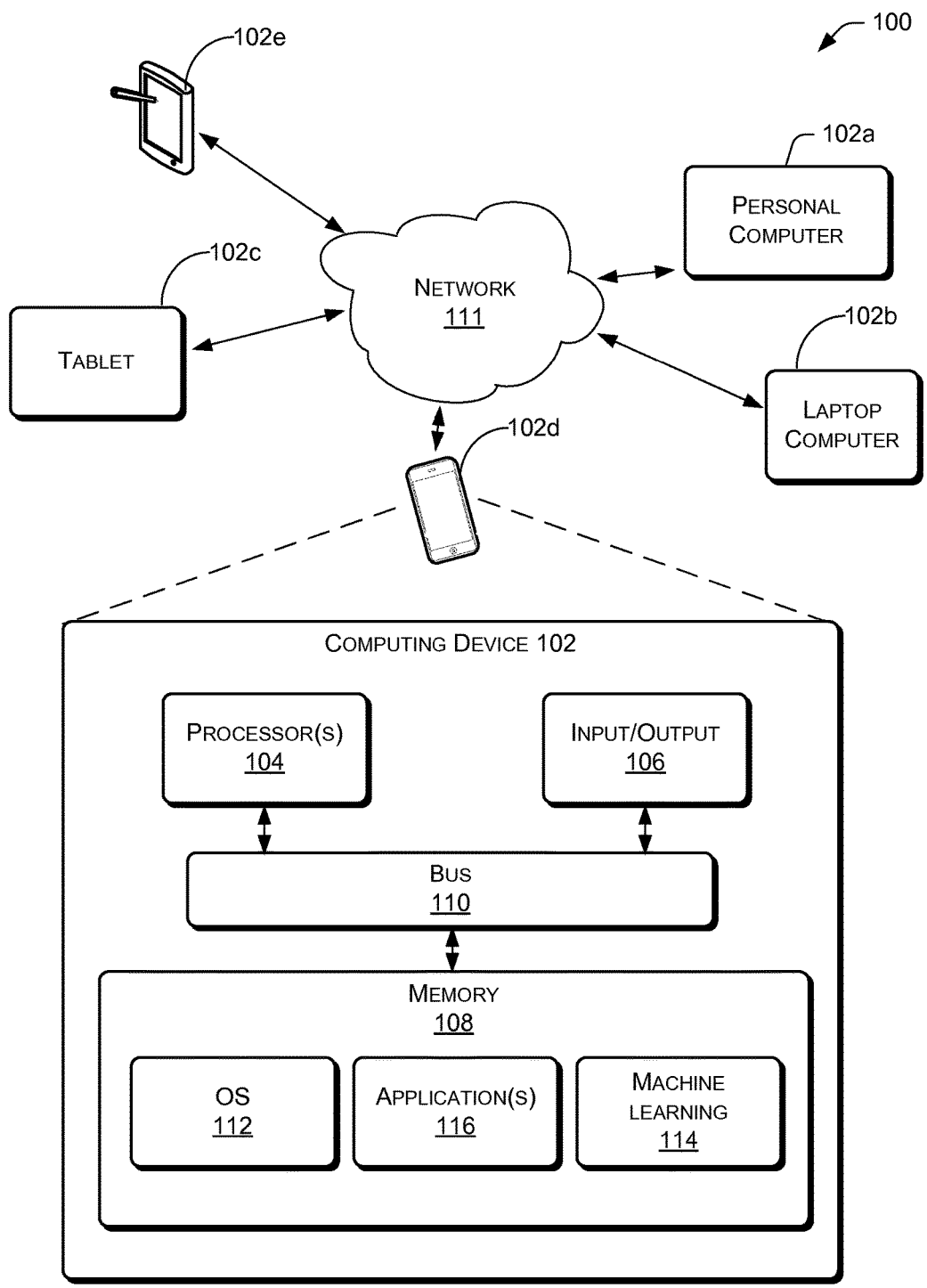
FIG. 1 is a block diagram depicting an example environment in which techniques described herein may be implemented.

Various examples describe techniques and architectures for a system, such as a machine learning system, that uses, among other things, a multi-task deep neural network (DNN) for representation learning for semantic classification (e.g., query classification) and semantic information retrieval tasks (e.g., ranking for web searches). Arbitrary text queries and documents may be mapped into semantic vector representations in a low dimensional latent space. Disparate tasks, such as operations necessary for classification and operations for ranking, may be combined. The system may apply such representation learning to query classification and web search, for example.

Representation learning (e.g., feature learning) may comprise a set of techniques that learn a transformation of raw data input to a representation that can be effectively exploited in machine learning tasks. For example, feature learning may be motivated by the fact that machine learning tasks such as classification often require input that is mathematically and computationally convenient to process. However, real-world data, such as images, video, and sensor measurements, is usually complex, redundant, and highly variable. In some implementations, feature learning may be divided into two categories: supervised and unsupervised feature learning.

In supervised feature learning, features may be learned with labeled input data. Examples include neural networks, multilayer perceptron, and (supervised) dictionary learning. In unsupervised feature learning, features are learned with unlabeled input data. Examples include dictionary learning, independent component analysis, auto-encoders, matrix factorization, and various forms of clustering.

In some embodiments, search engines project queries and documents to a semantic space and subsequently match the queries to the documents in that space. This is in contrast to comparing a lexical "surface" form of the queries and documents. For example, a search engine may use a Latent Semantic Analysis (LSA) technique to map queries and documents to a semantic space for matching. In some implementations, search engines may use models that express deeper relationships within input information. Such models may use neural networks having plural hidden layers. For example, auto-encoders may leverage deep learning to project linguistic items into a semantic space. One approach trains these auto-encoders in an unsupervised manner by, for example, generating model parameters that optimize the reconstruction of documents after the documents have been converted into a semantic space.

In some embodiments, a deep structured semantic model (DSSM) may be used to project an input item to an output item in a semantic space. For example, the input item may correspond to an input vector that represents one or more words, while the output item may correspond to a concept vector that expresses semantic information regarding the word(s). A training system may be used to produce the model using click-through data. More specifically, in one implementation, the training system may discriminatively train the model using the click-through data so that a conditional likelihood of clicked documents, given respective queries, is substantially maximized, and the conditional likelihood of non-clicked documents, given the respective queries, is reduced. In some embodiments, a DSSM is not a multi-task model. A DSSM may be designed for ranking tasks, for example.

In some embodiments, a DSSM comprises a pair of DNNs, where one DNN may be used for mapping the source (e.g., text) into a semantic vector, and the other DNN may be used for the target (e.g., text). In web search tasks, for example, query is the source, and the document is the target. Due to different characteristics of source and target, the two DNNs of DSSM may have substantially different network structures.

In some embodiments, a search engine may use the DSSM to map a query into a semantic space. The search engine may then compute the respective similarities between the query and a plurality of documents within the same semantic space. Based, at least in part, on measures of the similarity (along with other optional ranking factors), the search engine may identify a subset of documents which are substantially relevant to the query, if any. The search engine may offer satisfactory performance in view of the fact that its runtime objective (of discriminating relevant documents from irrelevant documents) is aligned with an objective function that was used to train the model of the DSSM. According to one illustrative example, the DSSM may be implemented as a DNN having plural hidden layers. The model may correspond to parameter values that define how information is propagated through the DNN.

According to other embodiments, a dimensionality-reduction process may transform an input item into a lower-dimension item, and then submit the lower dimension item to the DSSM. The lower-dimension item may be expressed in a space having a much smaller dimensionality compared to the space associated with the original input item. In one implementation, the dimensionality-reduction process may perform the transforming operation by expressing the input item as a plurality of n-grams, and then mapping the identified n-grams into a lower-dimension vector within the dimension-transformed space. According to one feature, the training system may perform its training operation in a more efficient manner by acting on lower-dimension items, as opposed to operating on the original untransformed input items (which may have very high dimensionality). In other features, models that use the training system may have relatively high model compactness, which may be attributed to aggressive compression by the dimensionality-reduction process (e.g., dimensionality-reduction from a 500 k word vocabulary to a 300-dimensional semantic representation). This can significantly reduce the amount of memory use and/or run-time requirements compared to systems that rely on surface-form features, for example.

Various examples are described further with reference to FIGS. 1-9.

The environment described below constitutes but one example and is not intended to limit the claims to any one particular operating environment. Other environments may be used without departing from the spirit and scope of the claimed subject matter.

FIG. 1 illustrates an example environment 100 in which example processes involving representation learning as described herein can operate. In some examples, the various devices and/or components of environment 100 include a variety of computing devices 102. By way of example and not limitation, computing devices 102 may include devices 102a-102e. Although illustrated as a diverse variety of device types, computing devices 102 can be other device types and are not limited to the illustrated device types. Computing devices 102 can comprise any type of device with one or multiple processors 104 operably connected to an input/output interface 106 and memory 108, e.g., via a bus 110. Computing devices 102 can include personal computers such as, for example, desktop computers 102a, laptop computers 102b, tablet computers 102c, telecommunication devices 102d, personal digital assistants (PDAs) 102e, electronic book readers, wearable computers, automotive computers, gaming devices, etc. Computing devices 102 can also include business or retail oriented devices such as, for example, server computers, thin clients, terminals, and/or work stations. In some examples, computing devices 102 can include, for example, components for integration in a computing device, appliances, or other sorts of devices.

In some examples, some or all of the functionality described as being performed by computing devices 102 may be implemented by one or more remote peer computing devices, a remote server or servers, or a cloud computing resource. In some examples, a computing device 102 may comprise an input port to receive an object representing linguistic information. Computing device 102 may further comprise one or multiple processors 104 to represent the object as an n-dimensional representation that is shared between or among two or more disparate tasks, and to transform the n-dimensional representation into a task-specific m-dimensional representation, where m is less than n, for example.

In some examples, as shown regarding device 102d, memory 108 can store instructions executable by the processor(s) 104 including an operating system (OS) 112, a machine learning module 114, and programs or applications 116 that are loadable and executable by processor(s) 104. The one or more processors 104 may include one or more central processing units (CPUs), graphics processing units (GPUs), video buffer processors, and so on. In some implementations, machine learning module 114 comprises executable code stored in memory 108 and is executable by processor(s) 104 to collect information, locally or remotely by computing device 102, via input/output 106. The information may be associated with one or more of applications 116. Machine learning module 114 may selectively apply any of a number of machine learning decision models stored in memory 108 (or, more particularly, stored in machine learning 114) to apply to input data.

Though certain modules have been described as performing various operations, the modules are merely examples and the same or similar functionality may be performed by a greater or lesser number of modules. Moreover, the functions performed by the modules depicted need not necessarily be performed locally by a single device. Rather, some operations could be performed by a remote device (e.g., peer, server, cloud, etc.).

Alternatively, or in addition, some or all of the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

In some examples, computing device 102 can be associated with a camera capable of capturing images and/or video and/or a microphone capable of capturing audio. For example, input/output module 106 can incorporate such a camera and/or microphone. Images of text, for example, may be converted to editable text and entered into a database that includes complex or nested events. Audio of speech may be converted to editable text and entered into the database that includes complex or nested events. Memory 108 may include one or a combination of computer readable media.

Computer readable media may include computer storage media and/or communication media. Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media embodies computer readable instructions, data structures, program modules, or other data in a modulated data signal, such as a carrier wave, or other transmission mechanism. As defined herein, computer storage media does not include communication media. In various examples, memory 108 is an example of computer storage media storing computer-executable instructions. When executed by processor(s) 104, the computer-executable instructions configure the processor(s) to, among other things, receive one or more syntactic dependency trees, access a database that includes nested events, and generate an event table based, at least in part, on (i) the one or more syntactic dependency trees, and (ii) the nested events, wherein the generated event table includes one or more nested relationships.

In various examples, an input device of input/output (I/O) interfaces 106 can be a direct-touch input device (e.g., a touch screen), an indirect-touch device (e.g., a touch pad), an indirect input device (e.g., a mouse, keyboard, a camera or camera array, etc.), or another type of non-tactile device, such as an audio input device.

Computing device(s) 102 may also include one or more input/output (I/O) interfaces 106 to allow the computing device 102 to communicate with other devices. Input/output (I/O) interfaces 106 can include one or more network interfaces to enable communications between computing device 102 and other networked devices such as other device(s) 102. Input/output (I/O) interfaces 106 can allow a device 102 to communicate with other devices such as user input peripheral devices (e.g., a keyboard, a mouse, a pen, a game controller, a voice input device, a touch input device, gestural input device, and the like) and/or output peripheral devices (e.g., a display, a printer, audio speakers, a haptic output, and the like).

Figure 2:
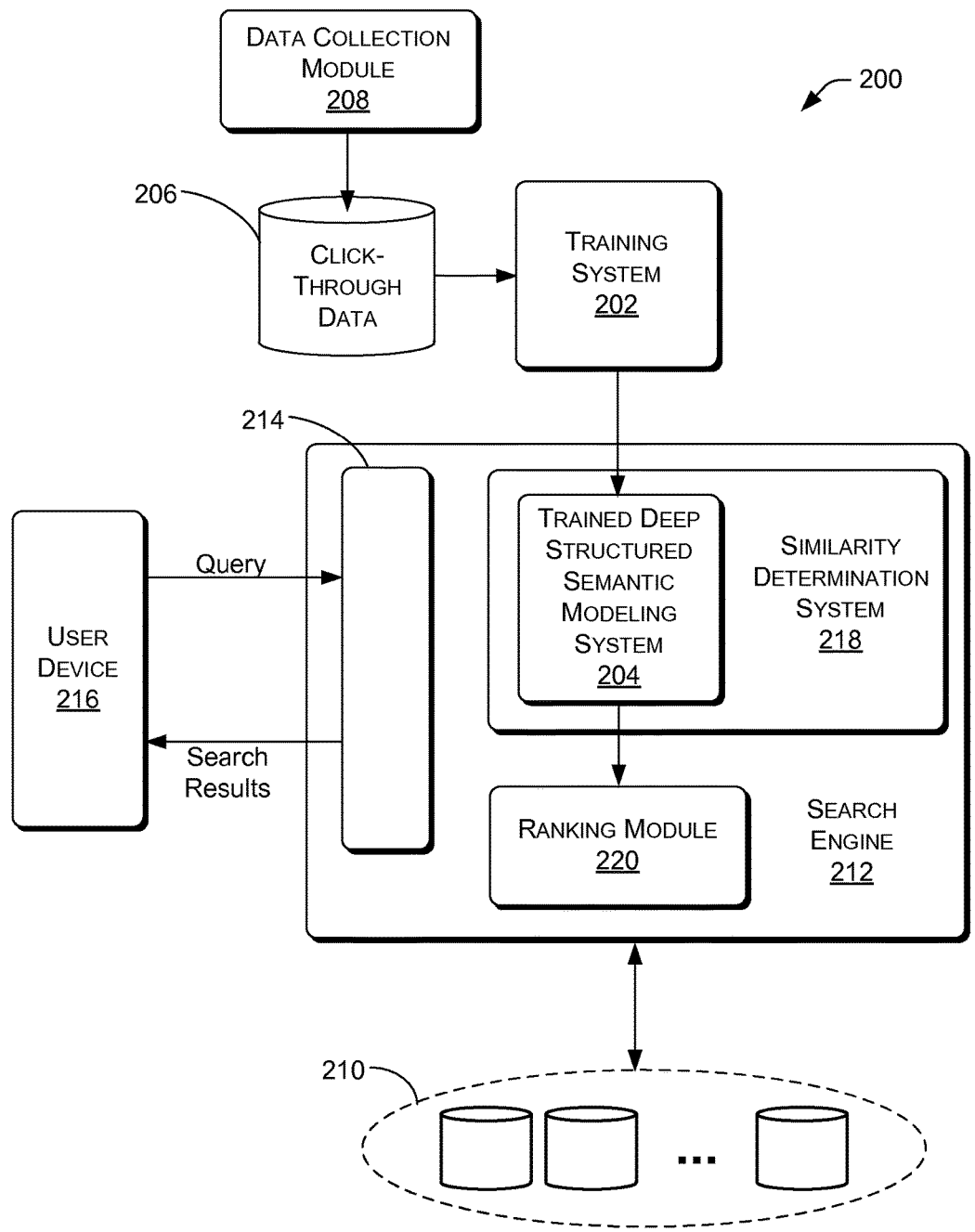
FIG. 2 is a block diagram depicting an example implementation of the environment of FIG. 1.

FIG. 2 is a block diagram depicting an example implementation of the environment of FIG. 1. For example, an environment 200 includes a training system 202 for producing a DSSM 204. The training system 202 produces the model based on click-through data 206 received by a data collection module 208 and maintained in a data store 210. More specifically, as will be explained in greater detail below, the training system 202 produces DSSM 204 such that a conditional likelihood of clicked documents, given respective queries, is maximized, and the conditional likelihood of non-clicked documents, for the respective queries, is reduced.

Different systems may make use of DSSM 204 that is produced by the training system 202. A search engine 212 provides a search engine interface 214 for receiving a query from a user, who inputs the query via a user device 216. A similarity determination system 218 then uses DSSM 204 to project the query into a semantic space. More formally stated, similarity determination system 218 projects a query input item that represents the query (e.g., corresponding to an input vector) into a query output item in the semantic space. The query output item captures latent semantic content associated with the query, and may be expressed as a query concept vector. In some examples, latent semantic content involves identifying patterns in relationships between terms and concepts contained in an unstructured collection of text. In a particular example, words that are used in the same contexts may be considered to have similar meanings.

Similarity determination system 218 may then match the query against each of a plurality of documents in the semantic space, to generate a plurality of similarity measures. More formally stated, similarity determination system 218 determines the similarity, in the semantic space, between the query output item and each document output item. Each document output item, in turn, is produced by projecting a document (provided in data store 210) into the semantic space, in the same manner that the query is projected into the semantic space. Each projected document output item may be expressed as a document concept vector.

A ranking module 220 may use the similarity measures, optionally along with any other features, to assign ranking scores to the documents, given the query. Each ranking score indicates the assessed relevance of a particular document to the submitted query. Based on the ranking scores, ranking module 220 can then generate a list of documents that are deemed most relevant to the user's query. The list may identify zero, one or more documents. Finally, search engine 212 can return the list of documents to user device 216 for the user's inspection.

From a very high-level perspective, DSSM 204 is discriminatively trained using an objective function that aims to boost the relevance of clicked documents, and decrease the relevance of non-clicked documents, with respect to respective queries in the click-through data. This objective function aligns with the principal objective of search engine 212. For this reason, search engine 212 may be able to leverage DSSM 204 to provide highly relevant search results to users.

A user may specify a query in manual form, e.g., by typing one or more query terms into an interface page provided by search engine 212. The user may also receive search results in a conventional manner, e.g., by receiving a ranked list of hyperlinks and snippets associated with the identified documents. However, search engine 212 can receive a search query in any manner, and provide its search results in any form. For example, in an alternative case, user device 216 can form a query by recognizing keywords in a user's speech. In another alternative technique, some component of the environment 200 can automatically formulate a query that expresses features associated with a triggering circumstance. For instance, user device 216 can formulate a query in an automatic manner based the current location of the user.

Further, similarity determination system 218 uses the DSSM 204 to compare a query with at least one document, within a semantic space. But more generally, similarity determination system 218 can use DSSM 204 to determine the similarity between any two instances linguistic information, in any application context. For example, in another case, similarity determination system 218 can use DSSM 204 to compare two documents within the semantic space, or to compare two phrases within the semantic space, etc. For instance, a user may identify a first document in a corpus as a query document, and then ask similarity determination system 218 to identify one or more other documents that are semantically similar to the query document, if any.

Nevertheless, to simplify the explanation, the scenario most frequently evoked herein corresponds to the above-described case in which an end user uses a user device 216 to submit a query to search engine 212. Further, to simplify the explanation, similarity determination system 218 will be explained for the specific case in which each input item constitutes an input vector and each output item constitutes a concept vector. A vector, as that term is used herein, broadly corresponds to any information having two or more components, e.g., a component for each element in a given vocabulary or set.

Figure 3:
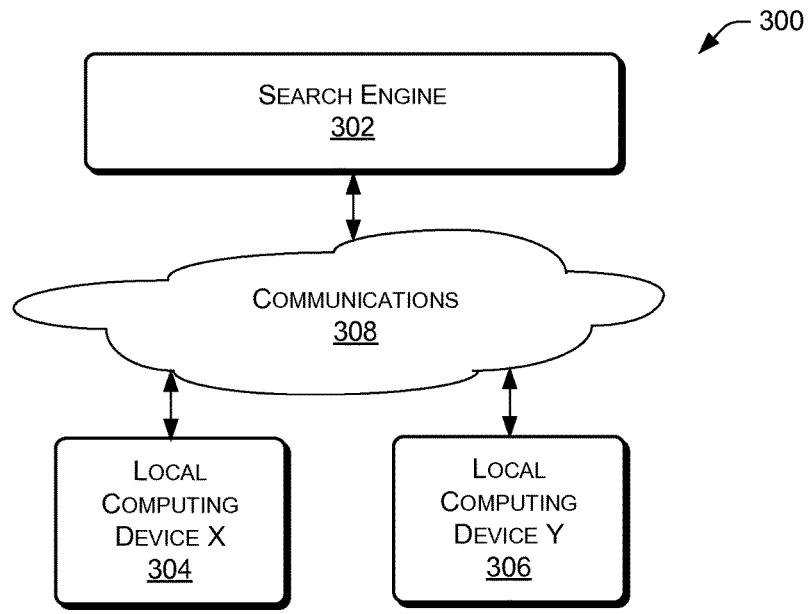
FIG. 3 is a block diagram depicting another example implementation of the environment of FIG. 1.

FIG. 3 is a block diagram depicting another example implementation 300 of the environment of FIG. 1. For example, the search engine 302 is implemented by one or more servers, optionally together with other computing equipment (e.g., data stores, routers, load balancers, etc.). The search engine 302 may be provided at one physical site or distributed over plural physical sites.

Users operate respective user devices (e.g., user device 304 and user device 306) to interact with the search engine 302. Each user device may represent any computing equipment, such as a personal computer, a laptop computer, a computer work station, a smartphone or other type of cellular phone, a media consumption device, a tablet-type computing device, a wearable computing device, a set-top box, a game playing console, and so on.

Each user device may interact with the search engine 302 via any communication mechanism 308, such as a wide area network (e.g., the Internet), a local area network, a point-to-point connection, and so on, or any combination thereof.

In an alternative implementation, one or more aspects of the search engine 302 can be implemented by each user device. For example, a user can interact with a local computing device to search a local database. In that context, the local computing device can implement all aspects of the search engine 302.

Figure 4:
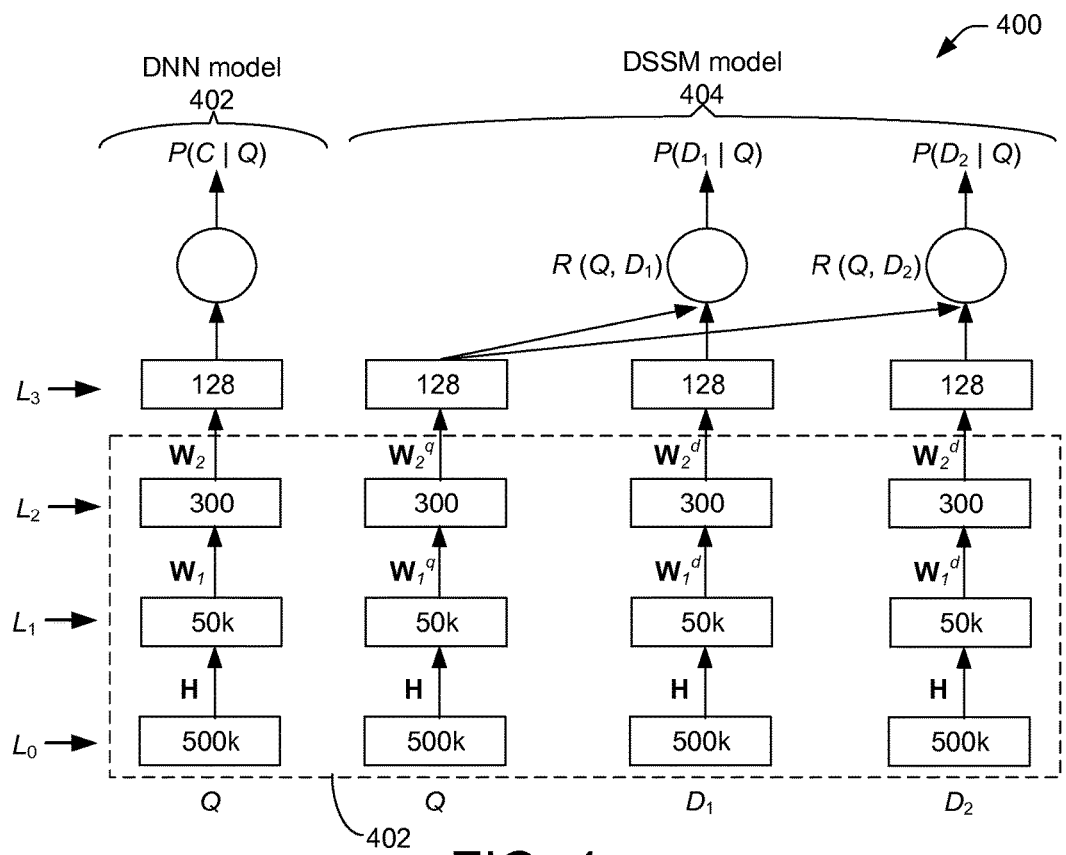
FIG. 4 illustrates an example process including a deep neural network model for classification and a deep structured semantic model for ranking.

FIG. 4 illustrates an example process 400 including an unshared DNN model 402 for classification and a DSSM 404 for ranking, according to some embodiments. In other words, unshared DNN model 402 may be used in a process for a query classification task and DSSM 404 may be used in a process for a web search ranking task. Process 400 includes unshared operational layers $L_0$, $L_1$, $L_2$, and $L_3$, which represent task-specific outputs. In other embodiments, a group 402 of operational layers, which may include $L_0$, $L_1$, and $L_2$, for example, may be shared among tasks, as described below in reference to FIG. 5. Different tasks may involve different forms of output. For example, output for a classification task may be the probability distribution of all classes; output for a ranking task may be the ranking order, and so on. Operational layers may be used to form such task-specific outputs.

Generally, individual operational layers are attached to a parameter matrix, which may be learned from data and may be used to convert an input vector of the operational layer to the output of the operational layer. An operational layer that is unshared across tasks means that (1) the parameter matrix may be learned using task-specific data, and (2) for an input vector of a particular task, a task-specific layer may be used to convert the input vector to the output, for example. In some instances, a vector leaned from multi-task learning may be applied to any number of tasks (e.g., non-classifier and non-web-search tasks). An example of a task, among others, involves machine translations to a multi-task deep learning framework, such that knowledge (e.g., a vector representation of a linguistic formulation) may be transferred from one language to a second language. In some implementations, such a task may be useful if there is relatively little multi-task (e.g., classification and web search) data for the second language.

Unshared DNN model 402 may act on a vector that expresses a query Q in a semantic space. DSSM 404 may act on a vector that expresses a document $D_1$ in the same semantic space. DSSM 404 may further act on a vector that expresses a document $D_2$ in the same semantic space, and so on. The processor reduces the dimensionality of the vectors that express query Q and documents $D_1$ and $D_2$ so as to render training more efficient, and thus more commercially feasible, and to expedite runtime processing of such vectors in an application phase such as, for example, executing searches.

Unshared DNN model 402 and DSSM 404 may be implemented by a processor comprising separate physical components or software instances, or by a single physical component or software instance, which processes linguistic items in series, one after the other. Moreover, the processor may optionally perform operations on documents $D_1$ and $D_2$ as an offline process, that is, in advance of a user submitting query Q. The processor may determine a measure of similarity between query Q and document $D_1$ in the semantic space and a measure of similarity between query Q and document $D_2$ in the semantic space. As described below, the processor may determine similarities as a cosine similarity measure.

In some embodiments, a multi-task DNN model (an example embodiment of which is described below for FIG. 5) may be viewed as a combination of such an unshared DNN model and DSSM. Other ways to merge such models are possible, and claimed subject matter is not so limited. A processor, such as processor(s) 104 (FIG. 1) may perform operations based, at least in part, on such models. Similarly (or alternatively), search engine 212 (FIG. 2) may perform operations based, at least in part, on such models. Descriptions herein involve one or more processors (hereinafter, "processor") as examples.

Given a search query Q, the processor may classify in a binary fashion as to whether query Q belongs to one of a number of domains of interest. For example, if query Q is "Denver sushi", the processor may determine that query Q belongs to the "Restaurant" domain. Accurate query classification enables a relatively rich personalized user experience, since the processor (e.g., operating as a search engine) may tailor a user interface and search results. In some particular implementations described herein, the processor may classify queries into any of a particular number of domains of interest (e.g., four such domains may be "Restaurant", "Hotel", "Flight", "Nightlife"). A single query may belong to multiple domains. Therefore, a set of binary classifiers may be built, one for each domain, to perform the classification, which may be regarded as binary classification tasks. Thus, for domain $C_t$, binary classification may be based, at least in part, on $P(C_t|Q)$ for ($C_t=\{0, 1\}$). For each domain $C_t$, supervised data may be given by (Q, $y_t=\{0, 1\}$) with $y_t$ being binary labels.

Given a search query Q and a document list L that includes $D_1$, $D_2$, . . . $D_n$, the processor may rank documents in the order of relevance based, at least in part, on similarity measures, which include input features. For example, ranking may involve identifying the document with the highest similarity measure and considering that document to be the most relevant document. Ranking may also involve identifying the document with the lowest similarity measure and considering that document to be the least relevant document. In some implementations, documents may be ranked based, at least in part, on the similarity measures in combination with other features that have a bearing on the relevance of the documents. For example, the processor may employ a ranking function that is trained by a machine learning technique based, at least in part, on any combination of descriptive features associated with queries and documents.

For example, if a query Q is "Denver sushi", the processor may return a list of relevant documents. The processor may estimate $P(D_1|Q)$, $P(D_2|Q)$ . . . for each document $D_n$ and rank according to these probabilities. There may be at least one relevant document $D_n$ for each query Q.

The processor, following process 400, maps arbitrary queries Q or documents D into fixed low-dimensional vector representations using DNNs. Such vectors may then be used by the processor to perform query classification or web searches. The processor may map queries Q or documents D into fixed low-dimensional vector representations in a number of operations expressed as unshared operational layers $L_0$, $L_1$, $L_2$, and $L_3$. In order to compute similarities, queries Q and documents D are mapped to vectors of the same dimension. Such operational layers individually represent task-specific outputs. For example, at operational layer $L_0$, either queries Q or documents D (e.g., $D_1$, $D_2$) may be initially represented as a bag of words, among a vocabulary of 500 k words. Here, the size 500 k of a vocabulary is merely an illustrative example, and a vocabulary may have any other size. Claimed subject matter is not limited in this respect.

Transitioning from operational layer $L_0$ to $L_1$, the processor may represent each word by a one-hot word vector, where the dimensionality of the vector is the vocabulary size (e.g., 500 k). However, due to the large size of vocabulary in real-world tasks, it may be very expensive to learn such kind of models. To alleviate this problem, the processor may use a word hashing method that maps a one-hot word vector, with an extremely high dimensionality (e.g., 500 k), into a limited letter-trigram space (e.g., with a dimensionality as low as 50 k, though claimed subject matter is not so limited). "H" in FIG. 4 represents such a mapping.

For example, a vector that expresses query Q may represent linguistic information having a keyword "cat." The processor may modify the information associated with the vector by adding a beginning boundary symbol (e.g., "#") to the start of the word, and adding an ending boundary symbol (e.g., "#") to the end of the word, e.g., to produce "#cat#". This result is called a converted item.

The processor partitions the converted item into a plurality of n-grams. Each n-gram contains a sequence of n consecutive letters in the input word. For example, the processor may partition the converted item "#cat#" into three tri-grams "#ca," "cat," and "at#". The processor may then map the identified n-grams to entries in the lower-dimension vector. For example, the processor may produce a lower dimension vector having 50K entries, corresponding to all the possible permutations of three-letter sequences that may be used in a 500K vocabulary associated with the input space. All entries in the 50K-element vector may have a count of zero, except the entries for "#ca," "cat," and "at#", which have counts of 1.

Word hashing complements a one-hot vector representation by allowing for representation of out-of-vocabulary words by n-gram vectors. Also, word hashing allows for spelling variations of a word to be mapped to points that are close to each other in the n-gram space. The processor may perform such mapping for individual queries Q and documents $D_1$, $D_2$ independent of one another.

Transitioning from operational layer $L_1$ to $L_2$, the processor may map the n-grams of operational layer $L_1$ into a 300-dimensional vector, as illustrated for operational layer $L_2$. For example, matrices $W_1$, $W_1^q$, and $W_1^d$ may be used for such mapping. Here, the size 300 is merely an illustrative example, and the size of vectors at operational layer $L_2$ may have any other size. Claimed subject matter is not limited in this respect. Mapping may be based individually on tasks associated with the respective queries Q and documents $D_1$, $D_2$. For example, matrices $W_1$, $W_1^q$, and $W_1^d$ may be different from one another. In other embodiments, described below, matrices used for mapping may be shared among multiple tasks.

Transitioning from operational layer $L_2$ to $L_3$, the processor may map the 300-dimensional vector of operational layer $L_2$ into a 128-dimension task-specific representation, as illustrated for operational layer $L_3$. For example, matrices $W_2$, $W_2^q$, and $W_2^d$ may be used for such mapping. Here, the size 128 is merely an illustrative example, and the size of vectors at operational layer $L_3$ may have any other size. Claimed subject matter is not limited in this respect. Mapping may be based individually on tasks associated with the respective queries Q and documents $D_1$, $D_2$. For example, matrices $W_2$, $W_2^q$, and $W_2^d$ may be different from one another. In other embodiments, described below, matrices used for mapping may be shared among multiple tasks.

Subsequent to transitioning $L_3$, the processor may measure the respective similarities between the query Q and the documents $D_1$, $D_2$ in the semantic space. To measure the similarities, the processor may perform the operations R(Q, D) for $D_1$, $D_2$, . . . $D_n$, respectively, on the 128-dimension task-specific representations (128 being an example size, as explained above).

Based, at least in part, on the similarity measurements, the processor may return a list of relevant documents by estimating $P(D_1|Q)$, $P(D_2|Q)$ . . . for each document $D_n$ and rank according to these probabilities. There may be at least one relevant document $D_n$ for each query Q. In some implementations, for example, the processor may employ a ranking function that is trained by a machine learning technique based, at least in part, on any combination of descriptive features associated with the queries and documents.

Figure 5:
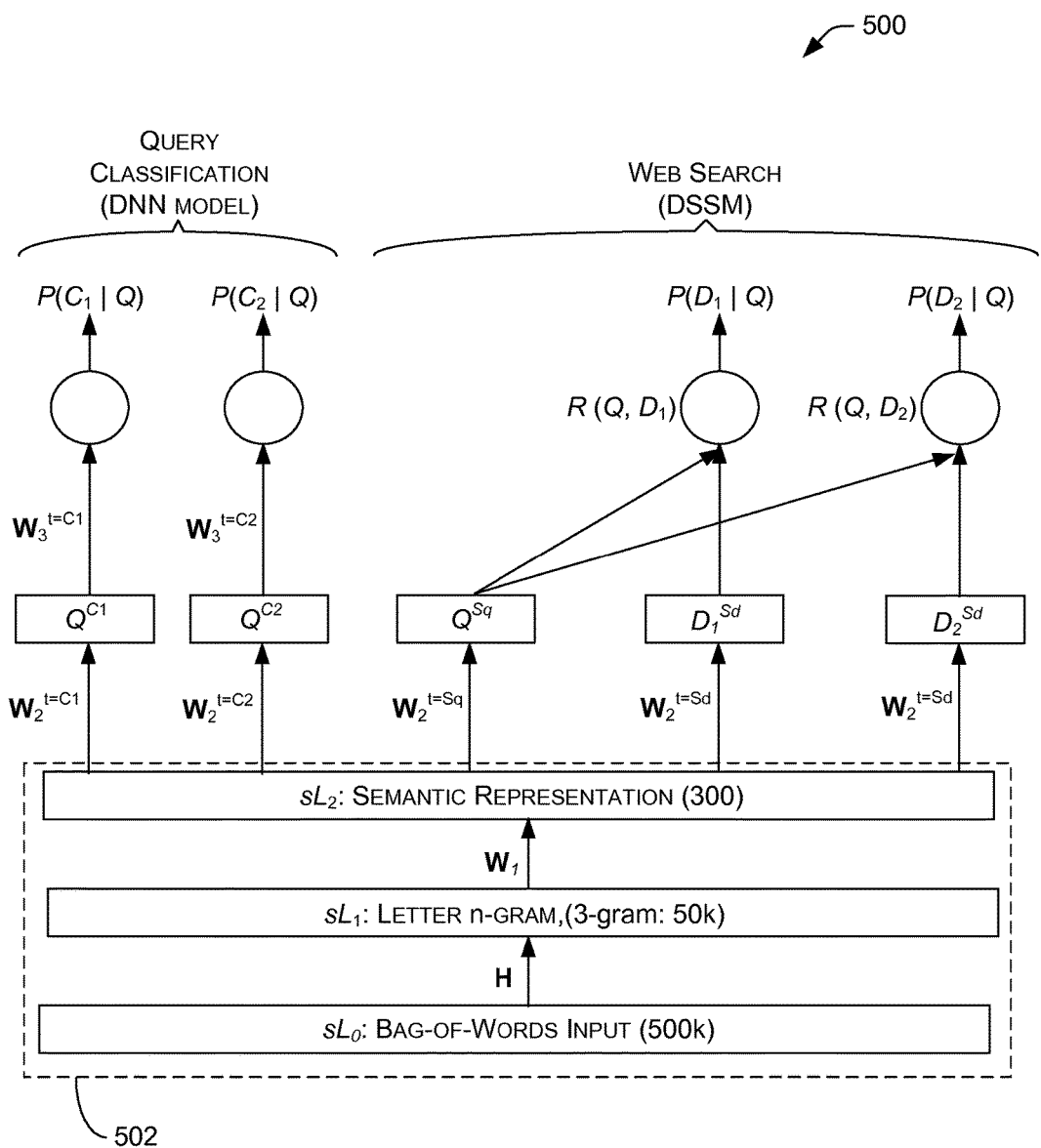
FIG. 5 illustrates an example process of a multi-task deep neural network for Representation Learning.

FIG. 5 illustrates an example process 500 of a multi-task DNN for representation learning. Process 500 has similarities to process 400 except that, among other things, some operational layers share tasks among one another. For example, process 400 includes unshared operational layers $L_0$, $L_1$, $L_2$, and $L_3$ that individually represent task-specific outputs. On the other hand, process 500 includes lower layers 502 that are shared across different tasks, whereas the top layers represent task-specific outputs. In particular, tasks, which may be disparate, may be shared within shared operational layers $sL_0$, $sL_1$, and $sL_2$. Tasks may be disparate in the sense that operations involved in the respective tasks may be fundamentally and markedly distinct in character. For example, operations to perform a task for classification may be disparate from operations to perform a task for ranking In another example, disparate tasks may include a scenario where data generation processes differ. Also, various domains in query classification may be considered disparate tasks.

In addition to ranking and classification tasks, another example of disparate tasks is sequence to sequence generation, such as translating a Chinese word sequence to its English translation. Other examples of disparate tasks include: question answering, where dialog or chitchat may be viewed as a sequence-to-sequence generation task; sequence labeling tasks, where label-named entities are generated based on an input sentence; multilingual speech recognition, where speech recognition for a specific language (e.g., Chinese, English, French, and so on) may be considered as a disparate task and where one task (e.g., speech recognition of English) may help another task (e.g., speech recognition for French); and a set of binary classification tasks, each for a different domain.

Process 500 may involve receiving a bag of words (e.g., one or more queries and/or documents), which may be represented by a relatively large-dimension vector (e.g., size of about 500 k), and mapping the bag of words to a relatively small-dimension vector (e.g., size of about 300). The latter vector is a shared semantic representation that may be trained by multi-task objectives.

Process 500 may be implemented by a processor comprising separate physical components or software instances, or by a single physical component or software instance, which processes linguistic items in series, one after the other. Moreover, the processor may optionally perform operations on a document list L that includes $D_1$, $D_2$, ... $D_n$, as an offline process, that is, in advance of a user submitting a query Q. The processor may determine a measure of similarity between query Q and individual documents in the semantic space.

In some embodiments, the multi-task DNN model of process 500 may be viewed as a combination of an unshared DNN model and DSSM, such as illustrated in FIG. 4, for example. Other ways to merge such models are possible, and claimed subject matter is not so limited.

At the lower level $sL_0$, input X (either a search query Q and/or a document list L that includes $D_1$, $D_2$, ... $D_n$) may be initially represented as a bag of words in a relatively large vocabulary, which may have a size of 500 k. Here, the size 500 k of a vocabulary is merely an illustrative example, and a vocabulary may have any other size. Claimed subject matter is not limited in this respect.

Transitioning from shared operational layer $sL_0$ to $sL_1$, the processor may represent each word by a one-hot word vector, where the dimensionality of the vector is the vocabulary size (e.g., 500 k). The processor may use a word hashing method that maps a one-hot word vector, with a high dimensionality (e.g., 500 k), into a limited letter-trigram space (e.g., with a dimensionality as low as 50 k, though claimed subject matter is not so limited). "H" in FIG. 5 represents such a mapping. In this fashion, the processor generates a plurality of n-grams. Each n-gram contains a sequence of n consecutive letters in the input word. The processor may then map the identified n-grams to entries in the lower-dimension vector. For example, the processor may produce a lower dimension vector having 50K entries, corresponding to all the possible permutations of three-letter sequences (e.g., for a trigram) that may be used in a 500K vocabulary associated with the input space. All entries in the 50K-element vector may have a count of zero, except the trigram entries, which each have a count of 1.

Transitioning from shared operational layer $sL_1$ to $sL_2$, the processor may map the n-grams of shared operational layer $sL_1$ into a 300-dimensional vector. Shared operational layer $sL_2$ is a semantic-representation layer for a shared representation learned across different (e.g., disparate) tasks. For example, this layer maps letter-trigram inputs into a 300-dimensional vector using a matrix $W_1$. Here, the size 300 is merely an illustrative example, and the size of vectors at shared operational layer $sL_2$ may have any other size. Claimed subject matter is not limited in this respect. Matrix $W_1$ may be shared among multiple tasks.

A 300-dimensional vector of $sL_2$, for example, may be mapped from letter trigrams by the operation $sl_2 = f(W_1 \cdot sl_1)$, where f( ) is the hyperbolic tangent nonlinear activation given by $f(z)=(1-e^{-2z})/(1+e^{-2z})$. In some implementations (e.g., involving example vector dimensions discussed here), $W_1$ is a 50 k-by-300 matrix used by the processor for generating a cross-task semantic representation for arbitrary text inputs (e.g., Q or D).

Transitioning from shared operational layer $sL_2$ to $sL_3$, the processor may map the 300-dimensional vector of shared operational layer $sL_2$ into a 128-dimension task-specific representation performing the operation $sl_3 = f(W_2^t \cdot sl_2)$, where t denotes different tasks (e.g., for query classification and/or web search). For example, t may be equal to $C_1$, $C_2$, $S_q$, and/or $S_d$, as illustrated in FIG. 5. Here, the size 128 is merely an illustrative example, and the size of vectors at operational layer $sL_3$ may have any other size. Claimed subject matter is not limited in this respect. In some implementations (e.g., involving example vector dimensions discussed here), $W_2$ is a 300-by-128 matrix used by the processor for generating 128-dimension task-specific representations for the different tasks.

The processor may generate query classifications for a classification tasks performing an operation expressed by $Q^{C1} \equiv l_3 = f(W_2^{t=C1} \cdot sl_2)$, which is a 128-dimension task specific representation for a query Q. The probability that Q belongs to a class $C_1$ (here, "$C_1$" expresses the same thing as "C1" in a superscript) is predicted by a logistic regression, with sigmoid $g(z)=1/(1+e^{-z})$: $P(C_1|Q)=g(W_3^{t=C1} \cdot Q^{C1})$.

The processor may generate web search results for a web search task by mapping both the query Q and the document D into 128-dimension task-specific representations $Q^{Sq}$ and $D^{Sd}$. Accordingly, the relevance score may be computed by the cosine similarity as:

$$R(Q,D)=\cos(Q^{Sq}, D^{Sd})=(Q^{Sq} \cdot D^{Sd})/\|Q^{Sq}\|\|D^{Sd}\|$$

In various embodiments, a training process may involve a mini-batch-based stochastic gradient descent (SGD) model, an example of which is shown as Algorithm 1.

Algorithm 1

Process 1: Training a multi-task DNN.
Initialize model $\Theta : \{W_1, W_2^t, W_3^t\}$ randomly
for iteration in 0...∞ do
    1: Pick a task t randomly
    2: Pick sample(s) from task t
        (Q, $y_t$ = {0,1}) for query classification
        (Q, L) for web search
    3: Compute loss: L($\Theta$)
        L($\Theta$) for query classification
        L($\Theta$) for web search
    4. Compute gradient: grad($\Theta$)
    5. Update model: $\Theta = \Theta - \epsilon$ grad($\Theta$)
end In each iteration, the processor may randomly select a task t, and the SGD model is updated according to a task-specific objective. Such updating approximately optimizes the sum of the multi-task objectives. For query classification of class $C_t$, the processor may use the cross-entropy loss function as the task-specific objective:

$$-\{y_t \ln P(C_t|Q)+(1-y_t)\ln(1-P(C_t|Q))\}$$

where $y_t=\{0, 1\}$ is the label and the loss is summed over all samples in a mini-batch (1024 samples in experiments). In some implementations, the objective for web search may follow a pair-wise learning-to-rank paradigm. Given a query Q, a list of documents L may be provided to the processor. The list of documents L may include a clicked document D+ (positive sample), and J randomly sampled non-clicked documents $\{D_j^-\}_{j=1,\ldots,J}$. The processor may subsequently minimize the negative log likelihood of the clicked document given queries across the training data $$-\log \Pi P(D^+|Q),$$

where the probability (likelihood) of a given document $D^+$ is computed using the expression $$P(D^+|Q)=\exp(\gamma R(Q,D^+))/\Sigma \exp((\gamma R(Q,D')).$$

Here, $\gamma$ is a tuning factor determined for held-out data.

In some particular embodiments, model parameters may be initialized with uniform distribution in the range (−sqrt (6/(fan$_{in}$+fan$_{out}$)), sqrt(6/(fan$_{in}$+fan$_{out}$))), though claimed subject matter is not so limited. Such initialization may provide better performance as compared with layer-wise pre-training, for example. Moment methods and AdaGrad training may increase speed of convergence, though not substantially more than results produced by plain SGD. In a particular implementation, the SGD learning rate may be fixed at $\epsilon$=0.1/1024 and the processor may run Algorithm 1 for 800,000 iterations, for example.

Figure 6:
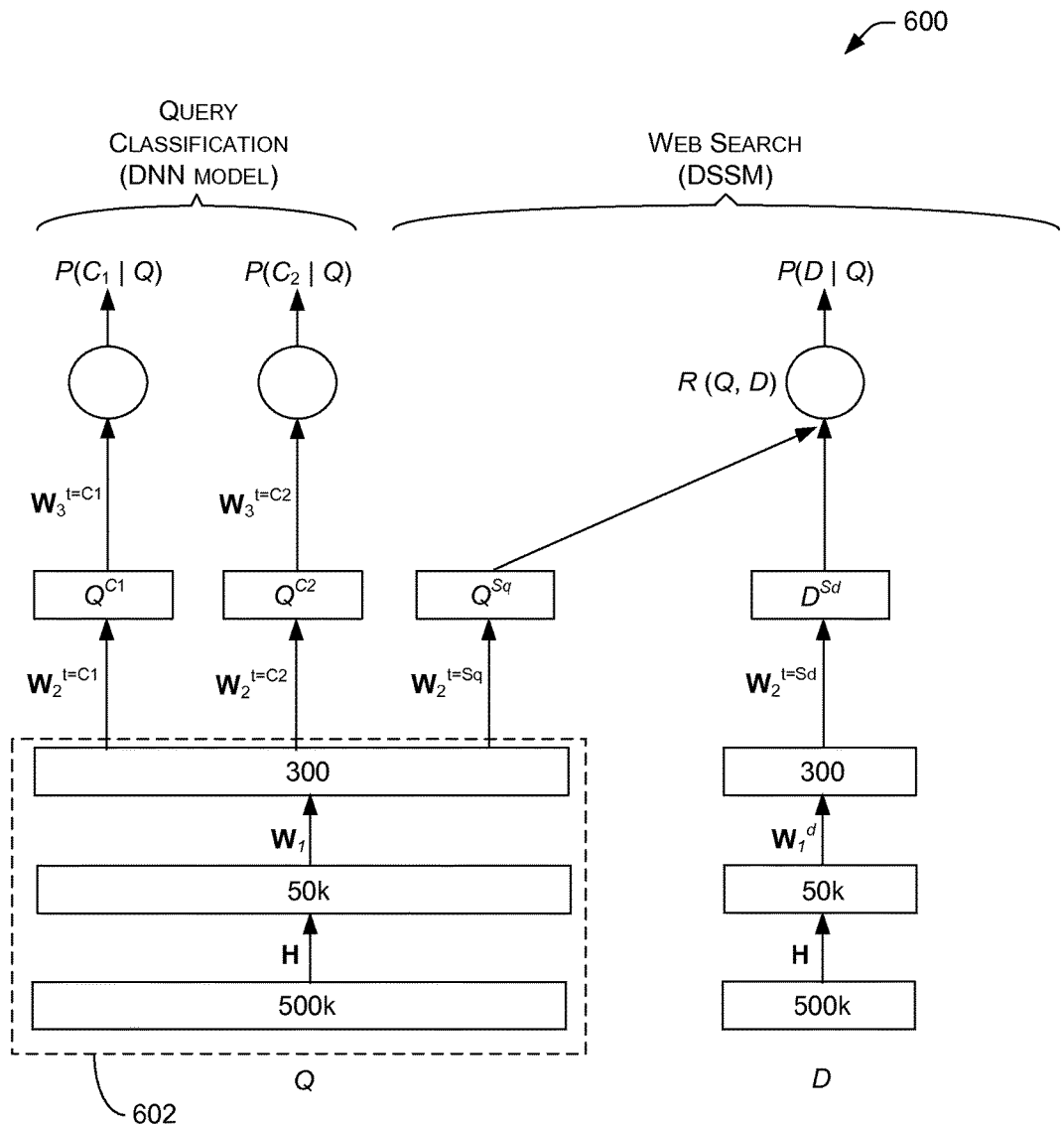
FIG. 6 illustrates an example multi-task process where a query portion is shared across tasks.

FIG. 6 illustrates an example multi-task process 600 where only a query portion (e.g., and not a search) is shared across tasks. Process 600 may include a shared DNN model for classification and a DSSM for ranking, according to some embodiments. In other words, the DNN model may be used in a process for a query classification task and the DSSM may be used in a process for a web search ranking task. Process 600 includes shared operational layers 602, which represent task-specific outputs.

The DNN model may act on a vector that expresses a query Q in a semantic space. The DSSM may act on a vector that expresses a document D in the same semantic space. The processor reduces the dimensionality of the vectors that express query Q and documents D so as to render training more efficient, and thus more commercially feasible, and to expedite runtime processing of such vectors in an application phase such as, for example, executing searches.

Other ways to merge the DNN model and the DSSM are possible, such as illustrated by processes 400 and 500, for example. Process 600 is a multi-task architecture, where the query portion is shared among all tasks and the DSSM retains independent parameters for computing document representations.

Figure 7:
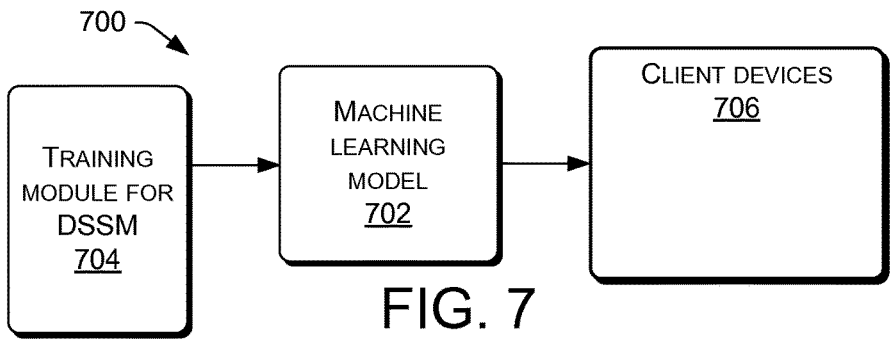
FIG. 7 is a block diagram of an example machine learning system.

FIG. 7 is a block diagram of a machine learning system 700, according to various examples. Machine learning system 700 includes a machine learning model 702, a training module 704 for a DSSM, and a number of client devices 706, any of which may access one or more databases. Machine learning model 702 may receive training data from offline training module 704. For example, training data can include data from a population, such as a population of elements in a database. A training system, such as 202 illustrated in FIG. 2, for example, may be the same as or similar to training module 704. Data from the population may be used to train machine learning model 702. Subsequent to such training, machine learning model 702 can be employed in client devices 706. Thus, for example, training using the data from the population for offline training can act as initial conditions for the machine learning model. Other techniques for training, such as those involving virtual evidence, described below, may be used.

Figure 8:
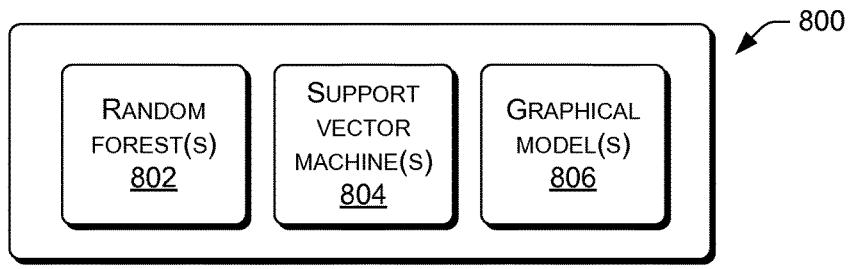
FIG. 8 is a block diagram of example machine learning models.

FIG. 8 is a block diagram of a machine learning model 800, according to various examples. Machine learning model 800 may be the same as or similar to machine learning model 702 shown in FIG. 7. Machine learning model 800 includes any of a number of functional blocks, such as random forest block 802, support vector machine block 804, and graphical models block 806, which may be applied to a DSSM or DNN model, for example. Random forest block 802 can include an ensemble learning method for classification that operates by constructing decision trees at training time. Random forest block 802 can output the class that is the mode of the classes output by individual trees, for example. Random forest block 802 can function as a framework including several interchangeable parts that can be mixed and matched to create a large number of particular models. Constructing a machine learning model in such a framework involves determining directions of decisions used in each node, determining types of predictors to use in each leaf, determining splitting objectives to optimize in each node, determining methods for injecting randomness into the trees, and so on.

Support vector machine block 804 classifies data for machine learning model 800. Support vector machine block 804 can function as a supervised learning model with associated learning algorithms that analyze data and recognize patterns, used for classification and regression analysis. For example, given a set of training data, each marked as belonging to one of two categories, a support vector machine training algorithm builds a machine learning model that assigns new training data into one category or the other.

Graphical models block 806 functions as a probabilistic model for which a graph denotes conditional dependence structures between random variables. Graphical models provide algorithms for discovering and analyzing structure in distributions and extract unstructured information. Applications of graphical models include information extraction, speech recognition, computer vision, and decoding of low-density parity-check codes, just to name a few examples.

Figure 9:
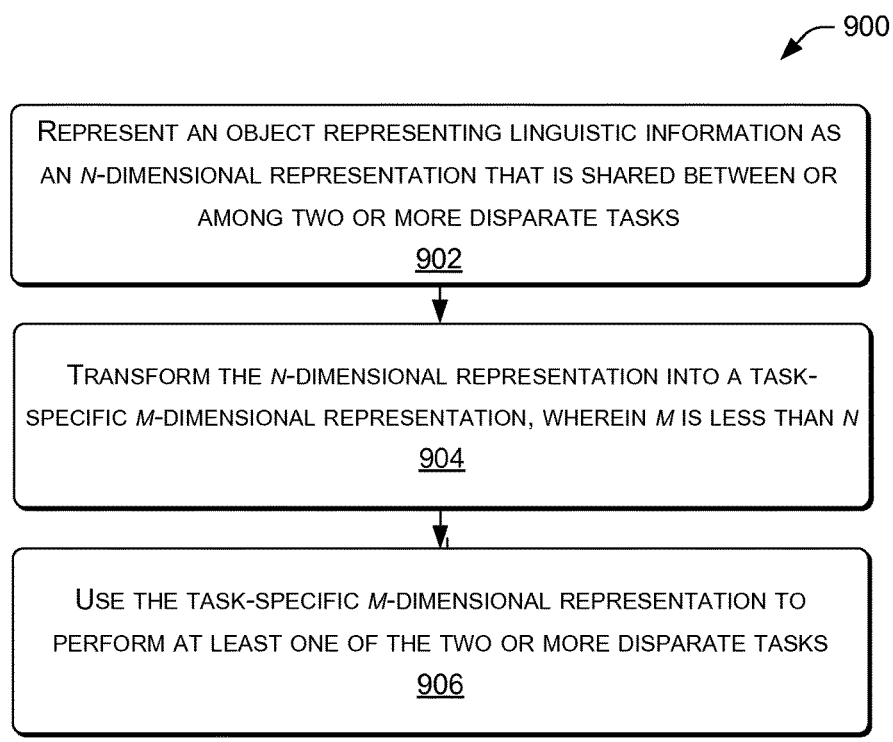
FIG. 9 is a flow diagram of an example representation learning process.

FIG. 9 is a flow diagram of an example multi-task DNN process 900 for a representation learning process 900 that may be performed by a processor. For example, process 900 may be performed by computing device 102, illustrated in FIG. 1. At block 902, the processor may represent an object representing linguistic information as an n-dimensional representation that is shared between or among two or more disparate tasks. For example, the object may be a search query or a document. The object may comprise a text message, email, a word-processing document, a web page, and image file, and so on, and claimed subject matter is not limited in this respect. In some implementations, the object may be represented as a one-hot vector based, at least in part, on a language vocabulary, which may be as large as about 500,000 words, for example.

At block 904, the processor may transform the n-dimensional representation into a task-specific m-dimensional representation, wherein m is less than n. In some implementations, the transforming may be based at least in part on the one or more disparate tasks.

At block 906, the processor may use the task-specific m-dimensional representation to perform at least one of the two or more disparate tasks. In some implementations, the first task-specific representation and the second task-specific representation each comprise a vector having dimensionality less than about 150 (e.g., 128). In some implementations, transforming the first linguistic object to the first semantic representation comprises generating n-grams from a bag-of-words. Transforming the first linguistic object to the first semantic representation may be based, at least in part, on deep neural networks, as described above, for example.

In another process, the processor may receive a first linguistic object and a second linguistic object. For example, the first linguistic object may be a search query and the second linguistic object may be a document. Either or both linguistic objects may comprise a text message, email, a word-processing document, a web page, and image file, and so on, and claimed subject matter is not limited in this respect. In some implementations, the first linguistic object and the second linguistic object may each be represented as one-hot vectors based, at least in part, on a language vocabulary, which may be as large as about 500,000 words, for example.

The processor may then transform, based at least in part on one or more disparate tasks, the first linguistic object to a first semantic representation. In some embodiments, the processor may further transform, based at least in part on one of the one or more disparate tasks, the first semantic representation to a first task-specific representation and transform, based at least in part on another one of the one or more disparate tasks, the second semantic representation to a second task-specific representation.

The processor may also transform, based at least in part on the one or more disparate tasks, the second linguistic object to a second semantic representation. In some implementations, the first task-specific representation and the second task-specific representation each comprise a vector having dimensionality less than about 150 (e.g., 128). In some implementations, transforming the first linguistic object to the first semantic representation comprises generating n-grams from a bag-of-words. Transforming the first linguistic object to the first semantic representation may be based, at least in part, on deep neural networks, as described above, for example.

The flow of operations illustrated in FIG. 9 is illustrated as a collection of blocks and/or arrows representing sequences of operations that can be implemented in hardware, software, firmware, or a combination thereof. The order in which the blocks are described is not intended to be construed as a limitation, and any number of the described operations can be combined in any order to implement one or more methods, or alternate methods. Additionally, individual operations may be omitted from the flow of operations without departing from the spirit and scope of the subject matter described herein. In the context of software, the blocks represent computer-readable instructions that, when executed by one or more processors, configure the processor(s) to perform the recited operations. In the context of hardware, the blocks may represent one or more circuits (e.g., FPGAs, application specific integrated circuits—ASICs, etc.) configured to execute the recited operations.

Any routine descriptions, elements, or blocks in the flows of operations illustrated in FIG. 9 may represent modules, segments, or portions of code that include one or more executable instructions for implementing specific logical functions or elements in the routine.

Generally, criteria to consider for building practical models are agility of deployment, relatively small memory footprint, and relatively fast run-time. Model 500, for example, may satisfy such criteria with relatively high model compactness, which may be attributed to aggressive compression from the 500 k dimensional bag-of-words input to 300-dimensional semantic representation in shared operational level $sL_2$. This significantly reduces the memory/run-time requirements compared to systems that rely on surface-form features, for example. The most expensive portion of a model such as model 500 is storage of the 50 k-by-300 matrix $W_1$ and its matrix multiplication with shared operational level $sL_1$, which is sparse. However, such features are trivial on modern hardware. Process 500 may use less than 150 KB of memory whereas, for example, SVM-Word may occupy about 200 MB of memory.

Compactness may be particularly important for query classification, since one may desire to add new domains after discovering new needs from the query logs of an operational system. On the other hand, it may be prohibitively expensive to collect labeled training data for new domains. Often, availability of training data may be low or non-existent.

Example Clauses

A. A system comprising: one or more processors; and memory storing instructions that, when executed by the one or more processors, configure the one or more processors to perform operations comprising: receiving a query or a document; mapping the query or the document into a lower dimensional representation by using at least one operational layer that shares operations of at least two disparate tasks, wherein the at least one operational layer is based, at least in part, on a multi-task deep neural network (DNN); and using the lower dimensional representation to perform at least one of the at least two disparate tasks.

B. The system as paragraph A recites, wherein the operations further comprise performing two operational layers that individually share the at least two disparate tasks to map the query or the document into the lower dimensional representation.

C. The system as paragraph A recites, wherein the at least two disparate tasks include query classifying and web searching.

D. The system as paragraph A recites, wherein the operations further comprise representing the query or the document as a bag of words in a first operational layer.

E. The system as paragraph A recites, wherein the at least one operational layer comprises hashing words of the query or the document into n-grams.

F. The system as paragraph E recites, wherein the operations further comprise using a second operational layer that shares the at least two disparate tasks to map the query or the document into the lower dimensional representation, and wherein the second operational layer comprises generating cross-talk semantic representations of the n-grams.

G. The system as paragraph A recites, wherein the at least one operational layer comprises generating a cross-talk semantic representation of the query or the document.

H. The system as paragraph A recites, wherein the at least one operational layer comprises machine-learning a semantic representation shared across the disparate tasks.

I. The system as paragraph A recites, wherein the lower dimensional representation comprises a task-specific representation of the query or the document.

J. The system as paragraph A recites, wherein operations further comprise using deep neural networks to map the query or the document into the lower dimensional representation.

K. A computing device comprising: an input port to receive an object representing linguistic information; and a processor to: represent the object as an n-dimensional representation that is shared between or among two or more disparate tasks; transform the n-dimensional representation into a task-specific m-dimensional representation, wherein m is less than n; and use the task-specific m-dimensional representation to perform at least one of the two or more disparate tasks.

L. The computing device as paragraph K recites, wherein the processor is configured to: transform the n-dimensional representation into the task-specific m-dimensional representation based, at least in part, on machine learning.

M. The computing device as paragraph K recites, wherein the n-dimensional representation comprises a bag-of-words or one or more one-hot vectors.

N. The computing device as paragraph K recites, wherein the two or more disparate tasks include query classifying and web searching.

O. The computing device as paragraph K recites, wherein the linguistic information comprises a query or a document.

P. A method comprising: receiving a first linguistic object and a second linguistic object;

transforming, based at least in part, on operations of one or more disparate tasks, the first linguistic object to a first semantic representation; transforming, based at least in part, on the operations of the one or more disparate tasks, the second linguistic object to a second semantic representation; and using the first semantic representation to perform at least one of the one or more disparate tasks.

Q. The method as paragraph P recites, further comprising: transforming, based at least in part, on one of the one or more disparate tasks, the first semantic representation to a first task-specific representation; and transforming, based at least in part, on another one of the one or more disparate tasks, the second semantic representation to a second task-specific representation.

R. The method as paragraph P recites, wherein the first linguistic object and the second linguistic object are each one-hot vectors based, at least in part, on a language vocabulary, and wherein the first task-specific representation and the second task-specific representation each comprise a vector having dimensionality less than about 150.

S. The method as paragraph P recites, wherein the transforming the first linguistic object to the first semantic representation comprises generating n-grams from a bag-of-words.

T. The method as paragraph P recites, wherein the transforming the first linguistic object to the first semantic representation is based, at least in part, on deep neural networks.

Although the techniques have been described in language specific to structural features and/or methodological acts, it is to be understood that the appended claims are not necessarily limited to the features or acts described. Rather, the features and acts are described as example implementations of such techniques.

Unless otherwise noted, all of the methods and processes described above may be embodied in whole or in part by software code modules executed by one or more general purpose computers or processors. The code modules may be stored in any type of computer-readable storage medium or other computer storage device. Some or all of the methods may alternatively be implemented in whole or in part by specialized computer hardware, such as FPGAs, ASICs, etc.

Conditional language such as, among others, "can," "could," "might" or "may," unless specifically stated otherwise, are used to indicate that certain examples include, while other examples do not include, the noted features, elements and/or steps. Thus, unless otherwise stated, such conditional language is not intended to imply that features, elements and/or steps are in any way required for one or more examples or that one or more examples necessarily include logic for deciding, with or without user input or prompting, whether these features, elements and/or steps are included or are to be performed in any particular example.

Conjunctive language such as the phrase "at least one of X, Y or Z," unless specifically stated otherwise, is to be understood to present that an item, term, etc. may be either X, or Y, or Z, or a combination thereof.

Many variations and modifications may be made to the above-described examples, the elements of which are to be understood as being among other acceptable examples. All such modifications and variations are intended to be included herein within the scope of this disclosure.

What is claimed is:
1. A system comprising:
one or more processors; and
memory storing instructions that, when executed by the one or more processors, configure the one or more processors to perform operations comprising:
receiving linguistic items, each comprising a query or a document and being associated with one of multiple disparate tasks, at least one of the linguistic items being associated with a first one of the tasks and at least one of the linguistic items being associated with a second one of the tasks;
mapping an initial input representation of the linguistic items into lower-dimensional task-specific output representations using a multi-task deep neural network comprising a plurality of operational layers and transitions between the operational layers,
each operational layer corresponding to a respective representation of the linguistic items and each transition between two adjacent layers mapping a higher-dimensional representation of the linguistic items at one of the adjacent layers to a lower-dimensional representation of the linguistic items at the other one of the adjacent layers,
at least one of the operational layers corresponding to a representation of the linguistic items that is shared among the multiple disparate tasks and results from a shared transition to that layer, and
at least a last one of the operational layers corresponding to the task-specific output representations, which are unshared among the multiple disparate tasks and result from respective unshared, task-specific transitions to the last layer; and using the lower-dimensional task-specific output representations of the linguistic items to perform the respective tasks associated therewith.

2. The system of claim 1, wherein at least two of the operational layers each correspond to a representation of the linguistic items that is shared among the multiple disparate tasks.

3. The system of claim 1, wherein the first and second disparate tasks include query classifying and web searching.

4. The system of claim 1, wherein a first one of the operational layers, corresponding to the initial input representation of the linguistic items, represents each linguistic item as a bag of words.

5. The system of claim 1, wherein the at least one operational layer corresponding to a shared representation comprises an operational layer representing the linguistic items as letter n-grams, and wherein the transition to that layer comprises hashing words of the linguistic items into the n-grams.

6. The system of claim 5, wherein the at least one operational layer corresponding to a shared representation further comprises an operational layer corresponding to semantic representations of the n-grams.

7. The system of claim 1, wherein the at least one operational layer comprises an operational layer corresponding to a semantic representation of the linguistic items.

8. A computing device comprising:
an input port to receive objects representing linguistic information, each object being associated with one of multiple disparate tasks, at least one of the objects being associated with a first one of the tasks and at least one of the objects being associated with a second one of the tasks; and a processor and memory storing instructions that, when executed by the processor, configure the processor to:
represent each of the objects as an n-dimensional representation at a shared operational layer of a multi-task deep neural network comprising a plurality of operational layers, the n-dimensional representation being shared between or among the first and second disparate tasks;
transform the n-dimensional representations into respective task-specific m-dimensional representations at an unshared operational layer of the multi-task deep neural network, wherein m is less than n, and wherein the n-dimensional representation of the at least one object associated with the first task is specific to the first task and the n-dimensional representation of the at least one object associated with the second task is specific to the second task; and
use the task-specific m-dimensional representations to perform the respective disparate tasks.

9. The computing device of claim 8, wherein the processor is configured to:
transform the n-dimensional representations into the task-specific m-dimensional representations based, at least in part, on machine learning.

10. The computing device of claim 8, wherein the n-dimensional representations comprise bag-of-words or one or more one-hot vectors.

11. The computing device of claim 8, wherein the first and second disparate tasks include query classifying and web searching.

12. The computing device of claim 8, wherein the linguistic information comprises a query or a document.

13. A method comprising:
receiving a first linguistic object and a second linguistic object, the first and second linguistic objects being associated with respective first and second disparate tasks;
transforming the first linguistic object to a first task-specific representation using a first plurality of operations comprising at least one operation shared among the first and second disparate tasks and at least one unshared operation specific to the first task;
transforming the second linguistic object to a second task-specific representation using a second plurality of operations comprising the at least one operation shared among the first and second disparate tasks and at least one unshared operation specific to the second task; and
using the first and second semantic representations to perform the first and second disparate tasks, respectively.

14. The method of claim 13,
wherein the at least one operation shared among the first and second disparate tasks generates first and second semantic representations of the first and second linguistic objects, respectively;
wherein the at least one unshared operation specific to the first tasks transforms the first semantic representation to the first task-specific representation; and
wherein the at least one unshared operation specific to the second task transforms the second semantic representation to the second task-specific representation.

15. The method of claim 13, wherein the first linguistic object and the second linguistic object are each one-hot vectors based, at least in part, on a language vocabulary, and wherein the first task-specific representation and the second task-specific representation each comprise a vector having dimensionality less than about 150.

16. The method of claim 14, wherein transforming the first and second linguistic objects to the respective first and second semantic representations comprises generating n-grams from bags-of-words.

17. The method of claim 13, wherein the first and second pluralities of operations are based, at least in part, on multi-task deep neural networks.

* * * * *